US006998443B2

(12) United States Patent
Lee et al.

(10) Patent No.: US 6,998,443 B2
(45) Date of Patent: Feb. 14, 2006

(54) FLAME RETARDANT INSULATION COMPOSITIONS HAVING IMPROVED ABRASION RESISTANCE

(75) Inventors: Lester Y. Lee, Hamilton, OH (US); Jeffrey S. Borke, Middletown, OH (US); Steven W. Horwatt, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 119 days.

(21) Appl. No.: 10/653,729

(22) Filed: Sep. 2, 2003

(65) Prior Publication Data

US 2005/0049335 A1  Mar. 3, 2005

(51) Int. Cl.
*C08L 23/04*  (2006.01)

(52) U.S. Cl. .................. 525/240; 428/394; 428/389; 428/372; 428/375; 428/390; 428/391; 525/281

(58) Field of Classification Search ............... 525/281; 428/394, 389, 372, 375, 390, 391
See application file for complete search history.

(56) References Cited

U.S. PATENT DOCUMENTS

| | | | |
|---|---|---|---|
| 2,997,456 A | 8/1961 | Mills | |
| 3,218,276 A | 11/1965 | Ringwald | |
| 3,225,018 A | 12/1965 | Zutty | |
| 3,392,156 A | 7/1968 | Donaldson | |
| 3,646,155 A * | 2/1972 | Scott | 525/288 |
| 3,974,101 A | 8/1976 | Witt | |
| 4,260,661 A | 4/1981 | Walters et al. | |
| 4,459,380 A | 7/1984 | Vostovich | |
| 4,693,937 A | 9/1987 | Wu et al. | |
| 4,797,323 A * | 1/1989 | Wu et al. | 428/389 |
| 4,808,643 A | 2/1989 | Lemoine et al. | |
| 4,824,883 A | 4/1989 | Walter et al. | |
| 5,196,462 A | 3/1993 | Berta | |
| 5,266,627 A * | 11/1993 | Meverden et al. | 524/527 |
| 6,372,828 B2 * | 4/2002 | Lee | 524/93 |
| 6,486,270 B1 | 11/2002 | Garrison et al. | |

FOREIGN PATENT DOCUMENTS

EP   0 211 624 A1   2/1987

* cited by examiner

*Primary Examiner*—Robert D. Harlan
(74) *Attorney, Agent, or Firm*—Gerald A. Baracka; Willliam A. Heidrich

(57) ABSTRACT

Moisture curable flame retardant insulation compositions for wire and cable having improved adhesion are provided. The compositions are comprised of an ethylene-silane copolymer, high density polyethylene resin, halogenated flame retardant, silanol condensation catalyst and stabilizer combination consisting of a zinc mercaptobenzimidazole and aromatic secondary amine.

16 Claims, No Drawings

FLAME RETARDANT INSULATION COMPOSITIONS HAVING IMPROVED ABRASION RESISTANCE

BACKGROUND OF THE INVENTION

1. Field of the Invention

The present invention relates to improved flame retardant insulation compositions for wire and cable products. The insulation compositions of the invention have improved abrasion resistance and are comprised of an ethylene-silane copolymer, high density polyethylene, halogenated flame retardant, silanol condensation catalyst and zinc mercaptobenzimidazole/aromatic secondary amine stabilizer combinations.

2. Description of the Prior Art

Fire resistant polyolefin compositions are widely used for wire and cable insulation. In addition to insulating and fire resistant properties, the compositions must also have and retain over their service life certain physical properties. One physical property which has become increasingly important in recent years, due to ever more stringent service requirements, is abrasion resistance. Even though currently available compositions may satisfy the requirements of SAE J1128 which utilizes a sandpaper abrasion test, these same compositions may fail to meet the abrasion requirements of ISO 6722, Section 9.2. This latter specification has been adopted by most European car manufacturers and utilizes a much more demanding needle abrasion test.

For example, flame retardant compositions useful as insulation for wire and cable applications are disclosed in U.S. Pat. No. 6,372,828. The compositions utilize an ethylene-alkyl acrylate copolymer base resin with brominated flame retardant, antimony trioxide, hydrated inorganic filler, chemical crosslinking agent and two-component stabilizer consisting of a zinc salt of a mercaptobenzimidazole and aromatic secondary amine. While the formulations meet the requirements of UL Standard 1581 and, more specifically, UL Subject 758, Style 3321, they do not met the stringent needle abrasion requirements of ISO 6722, Section 9.2.

Accordingly, there is a need for flame retardant insulation compositions having improved abrasion resistance. It would be particularly advantageous if moisture curable insulation compositions having improved abrasion resistance were available. Moisture crosslinkable insulation compositions for wire and cable are known. These compositions utilize silane copolymers obtained by grafting unsaturated alkoxysilanes to ethylene polymers as described in U.S. Pat. No. 3,646,155 or by copolymerizing ethylene with an unsaturated alkoxysilane as described in U.S. Pat. Nos. 3,225,018 and 3,392,156.

The use of benzimidazoles to stabilize polyolefin compositions, particularly polyethylene and polypropylene, is known. U.S. Pat. No. 3,218,276 discloses the use of alkyl benzimidazole to stabilize fiber-forming polyolefins. Polypropylene fiber-forming compositions containing 0.2 to 2.0 percent benzimidazole with other conventional additives are disclosed. U.S. Pat. No. 2,997,456 teaches the use of metallic mercaptobenzimidazole compounds as stabilizers for polymers of 1-olefins, primarily polypropylene, to protect against molecular degradation under conditions of elevated temperature and/or mechanical working. Zinc mercaptobenzimidazole is specifically mentioned.

The use of combinations of hindered phenols with various zinc salts of mercapto compounds to provide stabilization of cured and crosslinked polyolefins utilized as insulation for electrical conductors is disclosed in U.S. Pat. Nos. 4,260, 661, 4,693,937, 4,797,323 and 4,824,883. Combinations of IRGANOX 1010 with the zinc salt of 2-mercaptobenzimidazole (ZMB), the zinc salt of 2-mercaptotolylimidazole (ZMTI) and the zinc salt of 2-mercaptobenzothiazole (ZMBT) are disclosed. U.S. Pat. No. 4,459,380 discloses combining a sterically hindered phenol with a zinc salt of a mercaptoimidazole to stabilize crosslinkable curable ethylene-propylene rubber compositions. The reference provides for the inclusion of other conventional additives, such as $Sb_2O_3$, halogenated compounds, fillers, silanes and crosslinking agents in the formulations.

U.S. Pat. No. 5,196,462 shows the use of such stabilizer combinations to stabilize thermoplastic elastomers and indicates that other antioxidants, such as phenols, thiodipropionates and quinolines may also be present.

Rubber/silicone compositions containing a metal benzimidazole, an aromatic secondary amine, an organopolysiloxane oil and organic peroxide are disclosed in U.S. Pat. No. 4,808,643.

SUMMARY OF THE INVENTION

Moisture curable, i.e., crosslinkable, flame retardant compositions suitable for use as insulation for wire and cable products are provided. The insulation compositions of the invention which exhibit significantly improved abrasion resistance are comprised of ethylene-silane copolymer, high density polyethylene (HDPE), halogenated flame retardant, silanol condensation catalyst and a stabiizer component which is a combination of a zinc mercaptobenzimidazole and aromatic secondary amine.

More specifically, the crosslinkable flame retardant insulation compositions having improved abrasion resistance are comprised of 15 to 55 weight percent (wt. %), based on the weight of the composition, of an ethylene-silane copolymer; 15 to 55 wt. %, based on the weight of the composition, high density polyethylene; 5 to 40 wt. %, based on the weight of the composition, halogenated flame retardant; 2.5 to 15 wt. %, based on the weight of the composition, of a stabilizer consisting of a mixture of zinc mercaptobenzimidazole and aromatic secondary amine; and 0.01 to 1 wt. %, based on the weight of the composition, of a silanol condensation catalyst.

Useful silane copolymers are copolymers of ethylene and 1 to 20 wt. % ethylenically unsaturated silane having 2 or 3 alkoxy substitutents and, more particularly, vinylalkoxysilanes of the formula $H_2C{=}CHSi(OR)_3$ wherein R is a $C_{1-4}$ alkyl group. Copolymers of ethylene and vinyltrimethoxysilane are preferred especially when used with HDPEs having a density from 0.950 to 0.960 g/cm$^3$ and melt index (MI) from 0.3 to g/10 min.

Halogenated flame retardants are preferably brominated aromatic compound of the formula

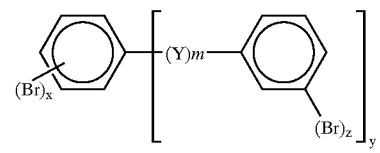

where x is 3 to 6; m is zero or 1; y is zero or 1; z is 3 to 5 and Y is oxygen or a bivalent aliphatic radical of the formula $(C_nH_{2n})$ where n is 1 to 6. Decabromodiphenyl ether, ethane-1,2-bis(pentabromophenyl) and ethylenebistetrabromophthalimide are especially useful brominated flame retardants. In one highly useful embodiment an inorganic synergist, preferably antimony trioxide, is used in conjunction with the halogenated flame retardant compound.

The stabilizer is a mixture of a zinc mercaptobenzimidazole of the formula

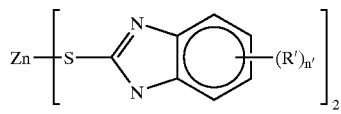

where R' is a $C_{1-4}$ alkyl group and n' is 0 to 4 with an aromatic secondary amine of the formula

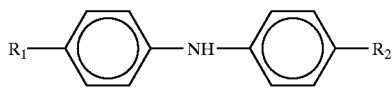

where $R_1$ is an aryl group of the formula

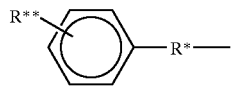

wherein R* is alkylene, alkylidene, —O—, —NH— or —$SO_2$— and R** is hydrogen or $C_{1-4}$ alkyl, and $R_2$ is hydrogen, alkyl, aryl, alkaryl, aralkyl or $R_1$, the weight ratio of said zinc mercaptobenzimidazole to said aromatic secondary amine ranging from 0.2:1 to 20:1. Preferred stabilizer combinations are those wherein the zinc mercaptobenzimidazole is selected from the group consisting of zinc 2-mercaptobenzimidazole and zinc 2-mercaptotolylimidazole and the aromatic secondary amine is selected from the group consisting of 4,4'-bis(α,α-dimethylbenzyl)diphenyl amine and N-phenyl-N'-(p-toluenesulfonyl)-p-phenylenediamine.

Tin carboxylates are a highly useful class of silanol condensation catalysts which can be used and dibutyltindilaurate is preferred.

DETAILED DESCRIPTION OF THE INVENTION

The present invention relates to flame retardant wire and cable insulation compositions which are moisture curable and exhibit significantly improved abrasion resistance. The compositions are comprised of an ethylene-silane copolymer, high density polyethylene (HDPE), halogenated flame retardant, silane condensation catalyst and stabilizer consisting of a combination of a zinc mercaptobenzimidazole with an aromatic secondary amine compound.

Ethylene-silane copolymers which can be used are copolymers of ethylene with ethylenically unsaturated silane compounds having 2 or 3 alkoxy substituents. Illustrative ethylenically unsaturated silanes include gamma-methacryloxypropyltrimethoxysilane, vinyltris(2-methoxyethoxy)silane, vinyltri-methoxysilane, vinyltriethoxysilane and the like. The ethylene-silane copolymers can have the ethylenically unsaturated silane compound incorporated into the polymer chain by copolymerization or attached to the polymer chain by grafting.

Ethylene copolymers with vinyltrialkoxysilanes of the formula $H_2C=CHSi(OR)_3$ where R is a $C_{1-4}$ alkyl group are particularly useful for the present compositions. Copolymers of ethylene with vinyltrimethoxysilane (VTMOS), i.e., where R is a methyl group, and vinyltriethoxysilane (VTEOS), where R is an ethyl group, are especially advantageous. The amount of vinylalkoxysilane copolymerized or grafted can range from 0.1 to 20 wt. % and, more preferably, will be in the range 0.25 to 7.5 wt. %. Useful ethylene-silane copolymers generally have MIs from 0.01 to 20 g/10 min.; however, MIs preferably range from 0.05 to 15 g/10 min. MIs are determined in accordance with ASTM D 1238-01, condition 190/2.16.

Silane copolymers obtained by grafting are disclosed in U.S. Pat. No. 3,646,155 which is incorporated herein by reference. Silane copolymers obtained by copolymerization of ethylenically unsaturated alkoxysilanes with ethylene are disclosed in U.S. Pat. Nos. 3,225,018 and 3,392,156 which are incorporated herein by reference.

One or more other olefins may also be present with the ethylene and vinyltrialkoxysilane. α-Olefin comonomers are especially useful. When present, these comonomers may constitute up to 20 wt. % of the ethylene-silane copolymer but are more preferably present in amounts less than 10 percent. Illustrative comonomers which can be present with the ethylene and vinyltrialkoxysilane include: α-olefins such as propylene, butene-1, hexene-1 and octene-1; vinyl esters such as vinyl acetate and vinyl butyrate; carboxylic acids and their esters such as methacrylic acid, acrylic acid, methyl acrylate and methyl methacrylate; vinyl ethers such as methyl vinyl ether; acrylonitrile; and the like.

HDPEs employed for the compositions of the invention are those obtained from known polymerization processes where ethylene is copolymerized with a comonomer such as propylene, butene-1, hexene-1 or octene-1. The density of the HDPE will vary depending on the type and amount of comonomer used and the polymerization process used. Densities of HDPEs employed for the invention range from 0.941 to 0.965 $g/cm^3$ and, more preferably, are in the range 0.950 to 0.960 $g/cm^3$. MIs will be from 0.1 to 20 g/10 min and, more preferably, from 0.3 to 10 g/10 min.

The HDPE resins can be produced using chromium catalysts, such as described in U.S. Pat. No. 3,974,101, or using Ziegler catalysts, such as described in European Patent No. 211,624. HDPEs produced by the former have a broad molecular weight distribution (MWD) whereas HDPEs obtained from Ziegler processes typically have narrow MWDs. Bimodal HDPEs obtained from Ziegler catalyzed polymerization processes conducted using two or more reaction zones, such as described in U.S. Pat. No. 6,486,270, can also be used and may be particularly advantageous where highly abrasion resistant compositions are desired.

Known halogenated flame retardant compounds are utilized to impart flame retardancy. Useful halogenated flame retardants are halogenated organic compounds having at least one halogen atom, preferably bromine or chlorine, bonded to an aromatic or cycloaliphatic ring which can be monocyclic, bicyclic or multicyclic rings. Bromine is the preferred halogen. The halogenated compound may contain other functional groups which do not adversely affect the processing or physical characteristics of the composition.

Examples of halogenated compounds of the above types include perchloropentacyclodecane; Diels-Alder adducts of hexachlorocyclopentadiene with "enes" such as maleic anhydride; hexabromobenzene; pentabromoethylbenzene; 2,4,6-tribromophenol; tribromophenyl allyl ether; octabromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylenebis(tetrabromophthalmide); hexabromocyclododecane; and the like A highly useful class of the halogenated flame retardant compounds for the compositions of the invention are brominated aromatic compounds corresponding to the general formula

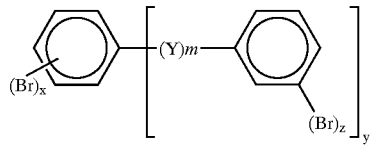

where x is 3 to 6; m is zero or 1; y is zero or 1; z is 3 to 5; and Y is oxygen or a bivalent aliphatic radical of the formula $(C_nH_{2n})$ where n is 1 to 6. Preferred within the meaning of Y are the following:

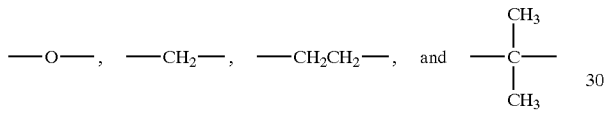

To minimize the amount of the flame retardant compound used, halogenated compounds with high halogen contents are advantageously employed. It is particularly desirable to employ brominated aromatic compounds having bromine contents greater than 65 percent and, more preferably, greater than 75 percent. In a highly useful embodiment of the invention, the flame retardant compound is decabromodiphenyl ether (DBDPO), ethane-1,2-bis(pentabromophenyl) or ethylenebistetrabromophthalimide.

It is preferred to include an inorganic synergist compound with the halogenated flame retardant. While it is possible to obtain useful formulations without a synergist, flame retardance is increased when synergists are included and it is generally possible to use lower levels of the halogenated compound. This latter feature is advantageous from an economic standpoint and also from the standpoint of maximizing the physical properties and processability. Antimony trioxide ($Sb_2O_3$) is the inorganic synergist of choice; however, other known synergists including antimony pentoxide, antimony silicates, boron compounds, tin oxide, zinc oxide, zinc borate, aluminum trioxide and aluminum trihydroxide can be used. The weight ratio of halogenated compound to synergist typically ranges from about 2:1 up to about 5:1 and, more preferably, is between about 2.5:1 and about 4:1.

A silanol condensation catalyst is included in the compositions to promote crosslinking and insure moisture cure. Silanol condensation catalysts known in the art for crosslinking alkoxysilane polymers can be employed. Such catalysts include organic bases, carboxylic acids and organometallic compounds including organic titanates and complexes or carboxylates of lead, cobalt, iron, nickel, zinc and tin, such as dibutyltindilaurate (DBTDL), dioctyltinmaleate (DOTM), dibutyltindiacetate, dibutyltindioctoate, stannous acetate, stannous octoate, lead naphthenate, zinc caprylate, cobalt naphthenate; and the like. Tin carboxylates, especially DBTDL and DOTM, are particularly useful silanol condensation catalysts for the compositions of the invention.

The stabilizer consists of a zinc salt of a mercaptobenzimidazole having the formula

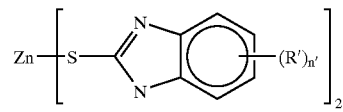

where R' is a $C_{1-4}$ alkyl group and n' is 0 to 4 with an aromatic secondary amine compound is employed. This combination affords superior stabilization in severe service wire and cable applications.

Mercaptobenzimidazoles where n' is 0 or 1 and particularly those wherein R' is methyl are especially useful for the invention. Zinc 2-mercaptobenzimidizole (ZMB) and zinc 2-mercaptotolylimidazole (ZMTI) are particularly advantageous and are available from commercial suppliers. Aromatic secondary amine compounds used with the mercaptobenzimidazole have the formula

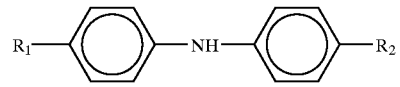

where $R_1$ is an aryl group of the formula

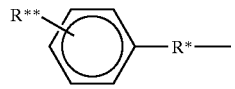

wherein R* is alkylene. alkylidene, —O—, —NH— or —$SO_2$— and R** is hydrogen or $C_{1-4}$ alkyl and $R_2$ is hydrogen, alkyl, aryl, alkaryl, aralkyl or $R_1$. Secondary aromatic amine compounds wherein R* is —$CH_2$—, —$CH_2CH_2$—, —$C(CH_3)_2$—, —NH— and —NH—$SO_2$— and R** is hydrogen or methyl are especially useful. Compounds within this latter group which are advantageously employed in view of their commercial availablility are 4,4'-bis(α,α-dimethylbenzyl)diphenyl amine (BDBDA) and N-phenyl-N'-(p-toluenesulfonyl)-p-phenylenediamine.

The weight ratio of the zinc mercaptobenzimidazole salt to aromatic secondary amine can range from 0.2:1 to 20:1 but, more preferably, will be from 0.5:1 to 10:1. In a highly useful embodiment the zinc mercaptobenzimidazole is ZMTI, the aromatic secondary amine is BDBDA and the ratio of ZMTI to BDBDA is 1:1 to 5:1.

The insulation compositions contain 15 to 55 wt. % ethylene-silane copolymer, 15 to 55 wt. % HDPE, 5 to 40 wt. % halogenated flame retardant, 2.5 to 15 wt. % zinc mercaptobenzimazole/aromatic secondary amine stabilizer combination and 0.01 to 1 wt. % silanol condensation catalyst. The above-specified weight percentages are based on the total weight of the composition.

Other compounds commonly employed in wire and cable formulations of this type can be included in the compositions of the invention. Such compounds are known in the art and generally are present in amounts cumulatively not exceeding about 20 wt. %, based on the total composition, and can include UV stabilizers, release agents, processing aids, nucleating agents, colorants, pigments, metal deactivators, lubricants, other polymers, and the like.

Additional flame retardants and stabilizers may also be present in the compositions. Optional flame retardants include hydrated inorganic fillers, which impart flame retardancy by releasing water of hydration during combustion or ignition, such as hydrated alumina, hydrated magnesia, hydrated calcium silicate, hydrated magnesium carbonate and the like. Hydrated alumina (ATH) is generally preferred. Optional stabilizer compounds can include hindered phenols such as 4,4'-methylenebis(2,6-di-t-butylphenol); tetrakis [methylene(3,5-di-t-butyl-4-hydroxyhydro-cinnamate)] methane; 1,3,5-trimethyl-2,4,6-tris(3,5-di-t-butyl-4-hydroxybenzyl)-benzene; 1,3,5-tris(3,5-di-t-butyl-4-hydroxybenzyl)-s-triazine 2,4,6(1H,3H,5H)trione; 1,2-bis (3,5-di-t-butyl-4-hydroxyhydrocinnamoyl)hydrazine; octadecyl 3,5-di-t-butyl-4-hydroxyhydrocinnamate; thiodiethylene bis-(3,5-di-t-butyl-4-hydroxy)hydrocinnamate and the like.

Particularly useful compositions of the invention contain 20 to 50 wt. % ethylene-silane copolymer, 20 to 50 wt. % HDPE, 7.5 to 35 wt. % halogenated flame retardant, 4 to 12 wt. % zinc mercaptobenzimidazole/aromatic secondary amine stabilizer and 0.025 to 0.5 wt. % silanol condensation catalyst. Most preferred are those compositions where the ethylene-silane copolymer is a copolymer of ethylene and VTMOS, the flame retardant is a combination of decabromodiphenyl ether, ethane-1,2-bis(pentabromophenyl) or ethylenebistetrabromophthalimide with antimony trioxide, the silanol condensation catalyst is dibutyltindilaurate, and the stabilizer is a combination of ZMTI and BDBDA.

Compositions of the invention are prepared by melt compounding the ingredients. Prior to melt compounding all or some of the components may be dry blended. Also, one or more masterbatches may be utilized to facilitate mixing.

The use of masterbatches to more effectively incorporate ingredients, particularly those used at low levels, into polyolefin resins is well known. The procedure is also useful since it minimizes the number of materials which must be stored and handled by processors. The technique involves preparing a masterbatch, sometimes also referred to as a concentrate, having relatively high concentrations of the ingredient(s) in a carrier resin in which the ingredients can be readily dispersed and which is compatible with the ethylene-silane copolymer and HDPE. The carrier resin used for the masterbatch is typically a polyolefin resin which can be the same HDPE resin used for the insulation or different. In some instances it may be advantageous to use a polyethylene resin having better processability than the HDPE resin. The masterbatch, typically in pellet form or some other form suitable for handling, is then "letdown" into the ethylene-silane, which may also contain some or all of the HDPE, in an amount calculated to achieve the desired level of the "letdown" ingredients in the final product. Masterbatches will generally contain 20 to 70 weight percent carrier resin and 30 to 80 weight percent of the ingredient(s) to be added. The melt compounded compositions are directly extruded onto a wire or cable product.

The compositions of the invention are useful for numerous wire and cable applications where an insulation coating having a good balance of oxidative, thermal, abrasion and flame resistance is required on a conductor. The compositions are, however, particularly suitable for automotive wiring in which the ability to withstand mechanical abuse is crucial in harness production and service life.

The following examples illustrate the improved abrasion resistant compositions of the invention. Those skilled in the art, however, will recognize numerous possible variations which are within the spirit of the invention and scope of the claims. All parts, percentages and ratios in the examples are on a weight basis unless otherwise indicated.

EXAMPLE 1

A moisture curable flame retardant insulation composition was prepared in accordance with the invention. The insulation had the following composition:

| | |
|---|---|
| 38.5% | Ethylene-VTMOS copolymer (density 0.923 g/cm$^3$; MI 1.5 g/10 min; 16% VTMOS) |
| 33.8% | HDPE (density 0.943 g/cm$^3$; MI 0.7 g/10 min;) |
| 10.67% | DBDPO |
| 3.4% | Dechlorane Plus ® (C$_{18}$H$_{12}$Cl$_{12}$) |
| 4% | Sb$_2$O$_3$ |
| 7% | ZMTI |
| 1.8% | BDBDA |
| 0.07% | DBDTL |

To prepare the above formulation two masterbatches were prepared. The first masterbatch (MB1) contained 49.7% HDPE, 19.4% DBDPO, 6.22% Dechlorane Plus, 7.4 Sb$_2$O$_3$, 14% ZMTI and 3.3% BDBDA. MB1 was prepared by mixing all of the ingredients in a ZSK 30 twin-screw extruder operated at 200 rpm with temperature zones set at 300–300° F. coupled to an underwater pelletizer. MB2 comprised of 98.6% HDPE and 1.4% DBDTL was prepared in the same manner. The pelletized MB1 and MB2 were then dry blended with the ethylene-VTMOS copolymer (in pellet form) at a ratio of 11.6:1:7.4 (MB1:MB2:silane copolymer) and extruded onto 20 AWG copper wire using a 2-1;2 inch Davis-Standard extruder equipped with a general purpose polyethylene screw (L/D 20:1). The temperature profile of the extruder was Zone 1 340° F.; Zone 2 350° F.; Zone 3 360° F.; Zone 4 370° F. and head temperature 380° F. The extruder line speed was 500 ft/min. Insulation thickness was 12 mils. The insulated wires were cured by immersing in a 95° C. water bath for 17 hours.

Cured insulated wire samples were evaluated for needle scrape abrasion in accordance with the procedure of ISO 6722, Section 9.2. This procedure utilizes an apparatus designed to abrade the surface of the insulation in both directions along the longitudinal axis of the wire and record the number of cycles until the needle abrades through the insulation and makes contact with the wire. The needle abrasion resistance (NAR) of wire samples insulated with the composition of the invention was 267 cycles, a value considered well within acceptable limits by the industry. Additionally, the insulation samples met the short-term aging and resistance to flame propagation requirements of ISO 6722, Sections 10 and 12, respectively.

COMPARATIVE EXAMPLE A

To demonstrate the markedly improved abrasion resistance of the compositions of the invention compared to heretofore known crosslinkable insulation compositions designed for high temperature flame retardant applications prepared in accordance with U.S. Pat. No. 6,372,828, a comparative insulation was prepared in accordance with Example 6 of the subject patent. The comparative insulation composition contained 47.3% ethylene-n-butyl acrylate copolymer, 12.5% ethylenebistetrabromophthalimide, 4.5% $Sb_2O_3$, 27% $Mg(OH)_2$, 2.5% organic peroxide and crosslinking coagent and 6.2% of a mixed stabilizer of ZMTI and BDBDA. The comparative formulation was extruded onto 20 AWG copper wire at a wall thickness of 16 mil and, after curing evaluated for abrasion resistance. The NAR for the comparative insulation was only 24 cycles.

COMPARATIVE EXAMPLE B

To further demonstrate the unexpected improvement in abrasion resistance achieved with the ethylene-silane copolymer/HDPE formulations of the invention, a comparative moisture curable flame retardant formulation was prepared in accordance with the teachings of U.S. Pat. No. 6,372,828. The ethylene-VTMOS copolymer was the same as used for Example 1. The comparative insulation had the following composition.

| | |
|---|---|
| 23% | Ethylene-VTMOS copolymer |
| 28% | Ethylene-n-butyl acrylate copolymer |
| 25.8% | $Mg(OH)_2$ |
| 12.5% | Ethylenebistetrabromophthalimide |
| 4.5% | $Sb_2O_3$ |
| 5% | ZMTI |
| 1.2% | BDBDA |
| 0.07% | DBTDL |

The composition was prepared as in Example 1 by combining a first masterbatch containing the ethylene-n-butyl acrylate copolymer, flame retardant and stabilizer components and a second masterbatch containing the ethylene-n-butyl acrylate and silanol condensation catalyst with the ethylene-VTMOS copolymer in the appropriate ratios and extruding a 16 mil thick layer onto 20 AWG copper wire. After curing for 17 hours in a 95° C. water bath the wire coated with the comparative insulation was evaluated for needle abrasion resistance. The NAR was only 20 cycles.

EXAMPLE 2

To demonstrate the ability to vary the compositions of the invention, the following formulation was prepared using the masterbatch procedures described in Example 1.

| | |
|---|---|
| 36.8% | Ethylene-VTMOS copolymer |
| 25% | HDPE (density 0.946 g/cm³; MI 4.0 g/10 min) |
| 5% | Ethylene-n-butyl acrylate copolymer |
| 10% | Talc |
| 12.5% | Ethylenebistetrabromophthalimide |
| 4.5% | $Sb_2O_3$ |
| 5% | ZMTI |
| 1.2% | BDBDA |
| 0.07% | DBTDL |

When extruded onto 20 AWG copper wire at a thickness of 16 mil and cured in accordance with the procedures described in Example 1, the insulation not only met the short-term aging and flame propagation requirements of ISO 6722 but also had an NAR of 560 cycles. An NAR of this magnitude is considered to be outstanding.

EXAMPLE 3

When a composition similar to that of Example 2 is prepared omitting the talc and using a polyolefin component that is a mixture of HDPE (as in Example 1) and linear low density polyethylene (density 0.935 g/cm³; MI 2.5 g/10 min) at a ratio of about 6:1 (HDPE:LLDPE) good abrasion values (NARs) are obtained.

EXAMPLE 4

When a composition similar to that of Example 2, except that the flame retardant component is a combination of DBDPO, Dechlorane Plus® and $Sb_2O_3$ at a ratio of 2.66: 0.85:1, respectively, is prepared and extruded onto 20 AWG copper wire at a thickness of 12 mils, the cured insulation has good abrasion resistance.

We claim:
1. A crosslinkable flame retardant insulation composition having improved abrasion resistance comprising:
   (a) 15 to 55 weight percent, based on the weight of the composition, copolymer of ethylene and 1 to 20 weight percent ethylenically unsaturated silane having 2 or 3 altoxy substituents;
   (b) 15 to 55 weight percent, based on the weight of the composition, high density polyethylene resin, said resin being a copolymer of ethylene with a comonomer selected from the group consisting of propylene, butene-1, hexene-1 and octene-1 and having a density of 0.941 to 0.96 g/cm³ and melt index of 0.1 to 20 g/10 min;
   (c) 5 to 40 weight percent, based on the weight of the composition, brominated aromatic compound of the formula

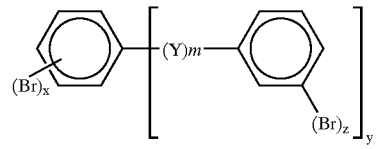

where x is 3 to 6; m is zero or 1; y is zero or 1; z is 3 to 5 and Y is oxygen or a bivalent aliphatic radical of the formula $(C_nH_{2n})$ where n is 1 to 6;
   (d) 2.5 to 15 weight percent, based on the weight of the composition, stabilizer consisting of a mixture of a zinc mercaptobenzimidazole of the formula

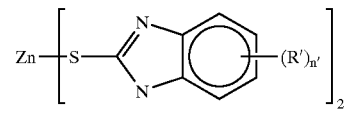

where R' is a $C_{1-4}$ alkyl group and n' is 0 to 4 and an aromatic secondary amine of the formula

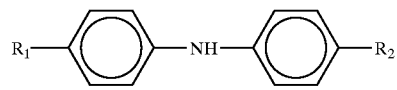

where $R_1$ is an aryl group of the formula

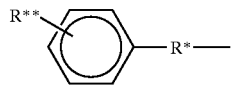

wherein R* is alkylene, alkylidene, —O—, —NH— or —SO$_2$— and R** is hydrogen or C$_{1-4}$ alkyl, and R$_2$ is hydrogen, alkyl, aryl, alkaryl, aralkyl or R$_1$, the weight ratio of said zinc mercaptobenzimidazole to said aromatic secondary amine ranging from 0.2:1 to 20:1; and (e) 0.01 to 1 weight percent, based on the weight of the composition, of a silanol condensation catalyst selected from the group consisting of organic bases, carboxylic acids and organometallic compounds.

2. The composition of claim 1 wherein the ethylenically unsaturated silane is a vinylalkoxysilane of the formula H$_2$C=CHSi(OR)$_3$ wherein R is a C$_{1-14}$ alkyl group.

3. The composition of claim 2 wherein the ethylenically unsaturated silane is vinyltrimethoxysilane.

4. The composition of claim 1 wherein (a) is a copolymer of ethylene and 0.25 to 7.5 weight percent vinyltrimethoxysilane and has a melt index of 0.05 to 15 g/10 min.

5. The composition of claim 1 wherein (a) is present in an amount from 20 to 50 weight percent.

6. The composition of claim 1 wherein (b) has a density of 0.950 to 0.960 g/cm$^3$ and melt index of 0.3 to 10 g/10 mm.

7. The composition of claim 1 wherein (b) is present in an amount from 20 to 50 weight percent.

8. The composition of claim 1 wherein the brominated aromatic compound is present in an amount from 7.5 to 35 weight percent and is selected from the group consisting of decabromodiphenyl ether, ethane-1,2-bis(pentabromophenyl) and ethylenebistetrabromophthalimide.

9. The composition of claim 1 wherein an inorganic synergist compound is present with the brominated aromatic compound and the weight ratio of brominated aromatic compound to inorganic synergist compound is from 2:1 to 5:1.

10. The composition of claim 9 wherein the inorganic synergist compound is antimony trioxide.

11. The composition of claim 1 wherein (e) is a tin carboxylate present in an amount from 0.025 to 0.5 weight percent.

12. The composition of claim 11 wherein the tin carboxylate is dibutyltindilaurate.

13. The composition of claim 1 wherein (d) is present in an amount from 4 to 12 weight percent, the zinc mercaptobenzimidazole is selected from the group consisting of zinc 2-mercaptobenzimidazole and zinc 2-mercaptotolylimidazole and the aromatic secondary amine is selected from the group consisting of 4,4'-bis(α,α-dimethylbenzyl)diphenyl amine and N-phenyl-N'-(p-toluenesulfonyl)-p-phenylenediamine.

14. The composition of claim 13 wherein (d) is a mixture of zinc 2-mercaptotolylimidazole and 4,4'-bis(α,α-dimethylbenzyl)diphenyl amine and the weight ratio of the respective components is 1:1 to 5:1.

15. A crosslinkable flame retardant composition having improved abrasion resistance comprising:

(a) 15 to 55 weight percent, based on the weight of the composition, of a copolymer of ethylene and 1 to 20 weight percent vinyltrimethoxysilane having a melt index from 0.05 to 15 g/10 min.;

(b) 15 to 55 weight percent, based on the weight of the composition, polyethylene resin, said resin being a copolymer of ethylene and a comonomer selected from the group consisting of propylene, butene-1, hexene-1 and octene-1 and having a density of 0.950 to 0.960 g/cm$^3$ and melt index of 0.3 to 10 g/10 min.;

(c) 5 to 40 weight percent, based on the weight of the composition, flame retardant consisting of a brominated aromatic compound selected from the group consisting of decabromodiphenyl ether, ethane-1,2-bis(pentabromophenyl) and ethylenebistetrabromophthalimide and antimony trioxide, the weight ratio of brominated aromatic compound to antimony trioxide ranging from 2:1 to 5:1;

(d) 2.5 to 15 weight percent, based on the weight of the composition stabilizer consisting of a mixture of a zinc mercaptobenzimidazole selected from the group consisting of zinc 2-mercaptobenzimidazole and zinc 2-mercaptotolylimidazole and aromatic secondary amine selected from the group consisting of 4,4'-bis(α,α-dimethylbenzyl)diphenyl amine and N-phenyl-N'-(p-toluenesulfonyl)-p-phenylenediamine, the weight ratio of zinc mercaptobenzimidazole to aromatic secondary amine ranging from 1:1 to 5:1; and (e) 0.01 to 1 weight percent, based on the weight of the composition, dibutyltindilaurate.

16. The composition of claim 15 comprising 20 to 50 weight percent (a), 20 to 50 weight percent (b), 7.5 to 35 weight percent (c), 4 to 12 weight percent (d) and 0.025 to 0.5 weight percent (e).

* * * * *